(12) United States Patent
Boyer

(10) Patent No.: US 6,666,581 B1
(45) Date of Patent: *Dec. 23, 2003

(54) BEARING FOR MULTI-SPINDLE BAR MACHINE

(76) Inventor: David M. Boyer, 109 South Maple St., Simpsonville, SC (US) 29681

( * ) Notice: Subject to any disclaimer, the term of this patent is extended or adjusted under 35 U.S.C. 154(b) by 139 days.

This patent is subject to a terminal disclaimer.

(21) Appl. No.: 10/037,950

(22) Filed: Nov. 9, 2001

Related U.S. Application Data

(63) Continuation-in-part of application No. 09/643,618, filed on Aug. 22, 2000, now Pat. No. 6,450,073.

(51) Int. Cl.[7] .............................. B23B 19/02; F16C 3/14
(52) U.S. Cl. ..................... 384/397; 384/403; 82/147; 184/6.14
(58) Field of Search ................................ 384/129, 275, 384/313, 316, 317, 322, 372, 397, 403, 404, 280, 283, 286, 291, 292; 184/5, 6.14; 82/1.4, 147

(56) References Cited

U.S. PATENT DOCUMENTS

| | | | | |
|---|---|---|---|---|
| 71,313 A | * | 11/1867 | Lane | 384/403 |
| 202,395 A | * | 4/1878 | Atkinson | 384/397 |
| 537,172 A | * | 4/1895 | Albrecht | 384/403 |
| 597,797 A | * | 1/1898 | Burke | 384/403 |
| 1,108,064 A | * | 8/1914 | Bonom | 384/398 |
| 1,362,571 A | * | 12/1920 | Jones | 384/292 |
| 1,379,587 A | * | 5/1921 | Fishser | 384/292 |
| 1,386,962 A | * | 8/1921 | Sharp | 384/290 X |
| 1,453,158 A | * | 4/1923 | Minney | 384/292 |
| 1,923,597 A | * | 8/1933 | Walker | 384/292 |
| 2,067,034 A | * | 1/1937 | Whiteley | 384/292 |
| 2,249,843 A | * | 7/1941 | Marsland | 384/292 |
| 2,510,549 A | * | 6/1950 | Buchi | 384/292 |
| 2,566,080 A | * | 8/1951 | Davids | 384/292 |
| 2,728,414 A | * | 12/1955 | Drissner | 82/1.4 |
| 3,264,045 A | * | 8/1966 | Tupper | 384/404 |
| 3,669,517 A | * | 6/1972 | Hughes | 384/292 |
| 4,293,169 A | * | 10/1981 | Inhofer | 384/397 |
| 4,576,488 A | * | 3/1986 | Steiner et al. | 384/292 |
| 4,655,615 A | * | 4/1987 | Mori | 384/397 X |
| 4,971,459 A | * | 11/1990 | McKenna | 384/397 X |
| 5,205,376 A | * | 4/1993 | Nowak | 184/6.14 |
| 5,645,357 A | * | 7/1997 | Alain | 384/397 |
| 5,921,349 A | * | 7/1999 | Sato et al. | 184/6.14 |

* cited by examiner

*Primary Examiner*—David A. Bucci
*Assistant Examiner*—Colby Hansen
(74) *Attorney, Agent, or Firm*—McNair Law Firm, P.A.

(57) ABSTRACT

A multi-spindle automatic bar machine having a housing, a plurality of spindles, each with a collet at one end, and mounted with a rotating head which is carried by the housing, the rotating head being adapted to index the spindles through a plurality of tooling stations. An improved machine bearing carried by the rotating head comprising a cylinder having a circular inner bearing surface carrying a spindle having a spindle bearing surface. Each cylinder bearing surface is formed with a pair of opposed spiral grooves each separated by a spiral flat. A lubricant supply supplying a filter lubricant to each of the spiral grooves. Each spiral groove is adopted to provide a passageway for the filtered lubricant through and over the entire machine bearing lubricating the each flat and the entire spindle bearing surface.

12 Claims, 3 Drawing Sheets

BEARING FOR MULTI-SPINDLE BAR MACHINE

This invention is a continuation-in-part of U.S. application Ser. No. 09/643,618, filed Aug. 22, 2000 now U.S. Pat. No. 6,450,073.

BACKGROUND OF THE INVENTION

This instant invention is directed to a high speed bearing for use primarily in multi-spindle automatic bar machines.

As is well known, multi-spindle automatic bar machines are used to cut or machine any number machine parts into shape. An example of such parts are set screws, locking nuts, cap screws, hex head bolts, setting gears and many others. Because of space constraints and because of the fine tolerances required for maintaining the work end of the work carrying spindle, machined bearings are used to support the spindles for rotation. These bearings have two major drawbacks. First, they require break in time, which ranges between 120 hours to 240 hours, during which the machine is run at a fraction of its normal operating speed. Secondly, they wear out after running only about eight months.

It is therefore a primary object of the instant invention to provide machine bearings for multi-spindle automatic bar machine which do not require a break-in period.

The second primary object of this invention is to provide machine bearings for multi-spindle automatic bar machines which provide a much extended life span.

Another object of the invention is a high speed bearing with superior lubricating ability.

Another object of the invention is a high speed bearing in which one of the bearing cylinder and the bearing spindles is coated with a self-lubricant.

Another object of the invention is a high speed bearing having a continuous and replenishing lubricating system over the entire bearing surface.

Another object of the invention is a replenishing lubricating system which includes a filter system for removing impediments from the lubricant.

SUMMARY OF THE INVENTION

The instant invention is directed primarily to a multi-spindle automatic bar machine which includes a housing, a plurality of spindles each having a collet at one end, and each mounted on a rotating head carried by the housing. The rotating head is adapted to rotate the spindles through a plurality of tooling stations where various industrial elements are cut to shape.

Each spindle is formed with a bearing surface about its periphery which is supported by the rotating head. The rotating head is formed with a plurality of machine bearings about its circumference in which each of the spindle bearings are carried. Each machine bearing comprises a cylinder having a circular inner bearing surface which engages with the respective spindle bearing surface. The cylinder bearing surface is formed with a spiral groove which is separated by a spiral flat. The spiral groove, which extends across the entire cylinder bearing surface, is adapted to provide a passageway for lubricant to be delivered over the entire bearing surface.

The cylinder bearing is formed of bronze or iron, while the spindle bearing surface is made of medium or high carbon steel. It is preferred that the spindle is coated with a composite coating of tungsten carbide and carbon.

The cylinder bearing includes an outer circumferential groove overlaying an inner circumferential groove and at least one hole passing through the cylinder interconnecting with the inner and outer circumferential grooves. The hole along with the inner and outer circumferential grooves provide passageways for lubricant into the cylinder. The spiral groove intersects with the hole or the inner circular groove, or both.

The spiral groove comprises a first spiral groove which spirals in a first direction and a second spiral groove which spirals in a second direction opposite to the first direction. The first and second spiral grooves extend through opposite ends of the cylinder. The first and second spiral grooves begin substantially centrally of the cylinder bearing interconnecting with the circular groove about the inner surface of the cylinder.

A pair of superimposed circular grooves are formed about the outer and inner surfaces of the cylinder. The outer groove is connected with the lubricant supply while the inner groove is connected with the first and second spiral grooves at substantially the center of the cylinder.

A plurality of holes are formed about the periphery of the cylinder and interconnect the outer and inner grooves.

A recess is formed in the outer surface of the cylinder about each outer groove. A filter is press fitted in each recess.

The lubricant passes from the supply about the outer groove, into the holes and about the inner groove. From the inner groove it passes into the spiral grooves and about the inner surface of the cylinder. The filter acts to remove all trash or particles from the lubricant before it reaches the inner circular groove.

DESCRIPTION OF A PREFERRED EMBODIMENT

Figure 1:
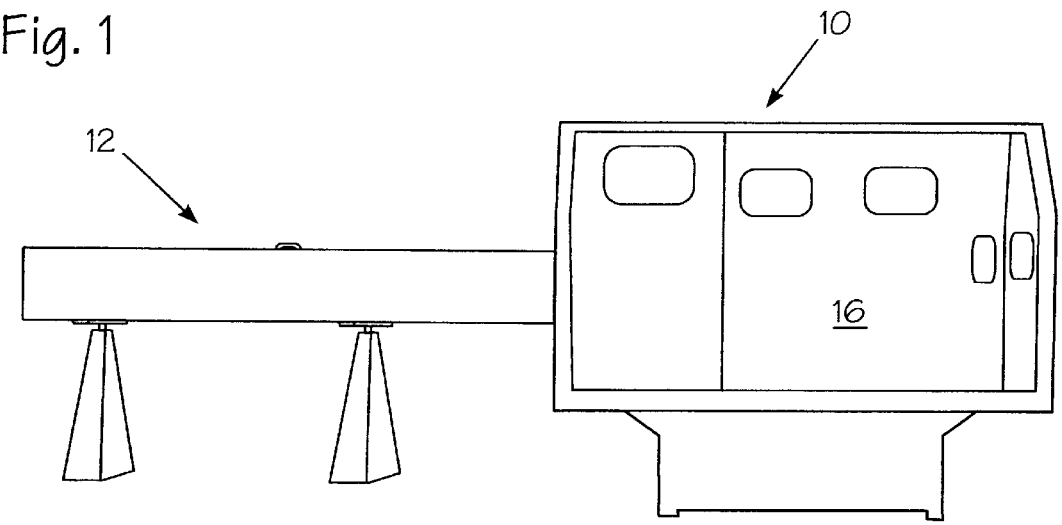
FIG. 1 is a side view of a multi-spindle automatic bar machine.
Figure 2:
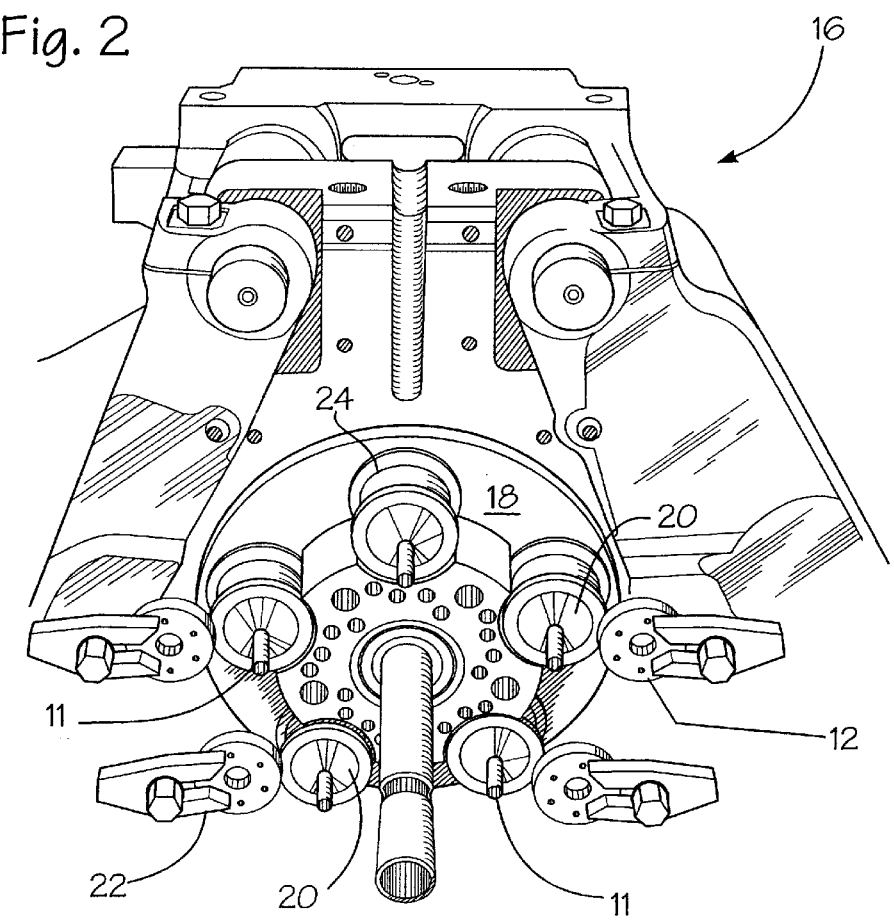
FIG. 2 is a perspective front view of the machining end of an automatic bar machine.
Figure 3A:
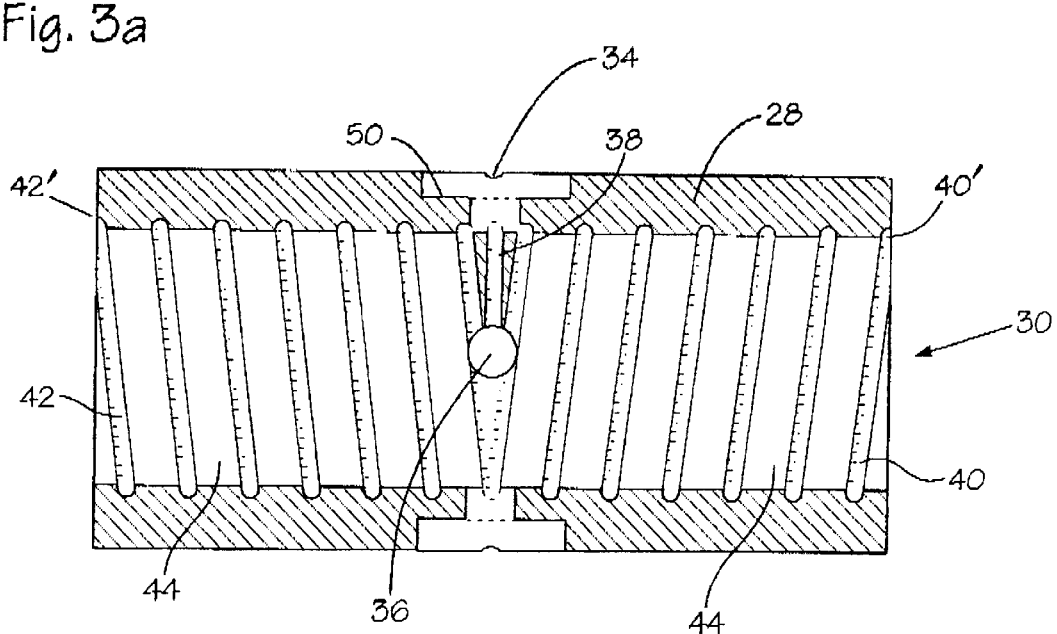
FIG. 3a is a sectional side view of a machine bearing cylinder for use with a machine as shown in FIGS. 1 and 2.
Figure 3B:
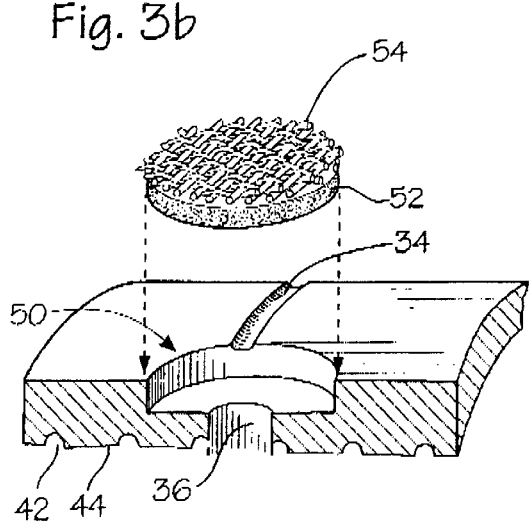
FIG. 3b is a cutaway section of FIG. 3a showing in more detail the groove, recess and hole.
Figure 3C:
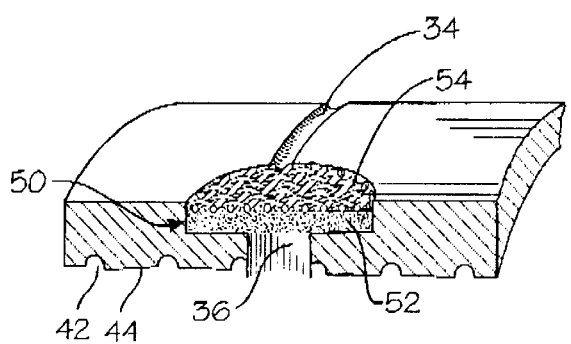
FIG. 3c is similar to FIG. 3b showing the filter in the recess.
Figure 4:
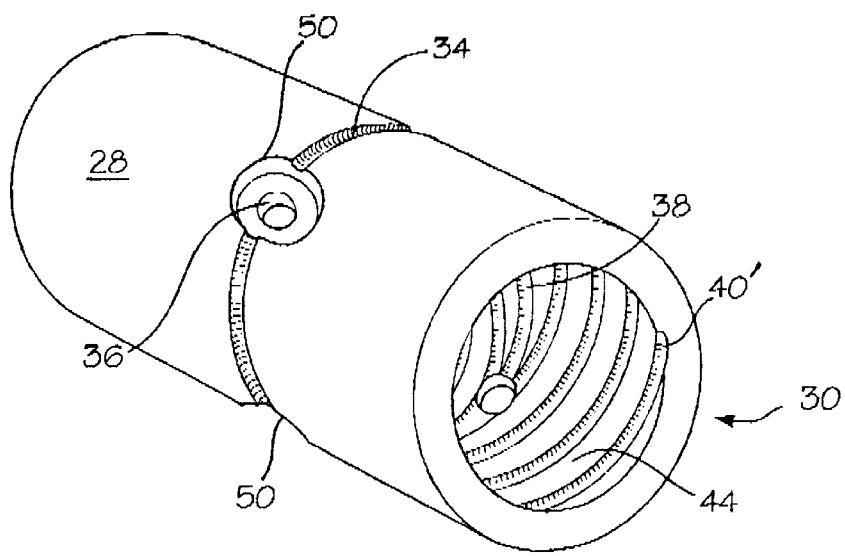
FIG. 4 is a perspective view of the cylinder of FIG. 3.
Figure 5:
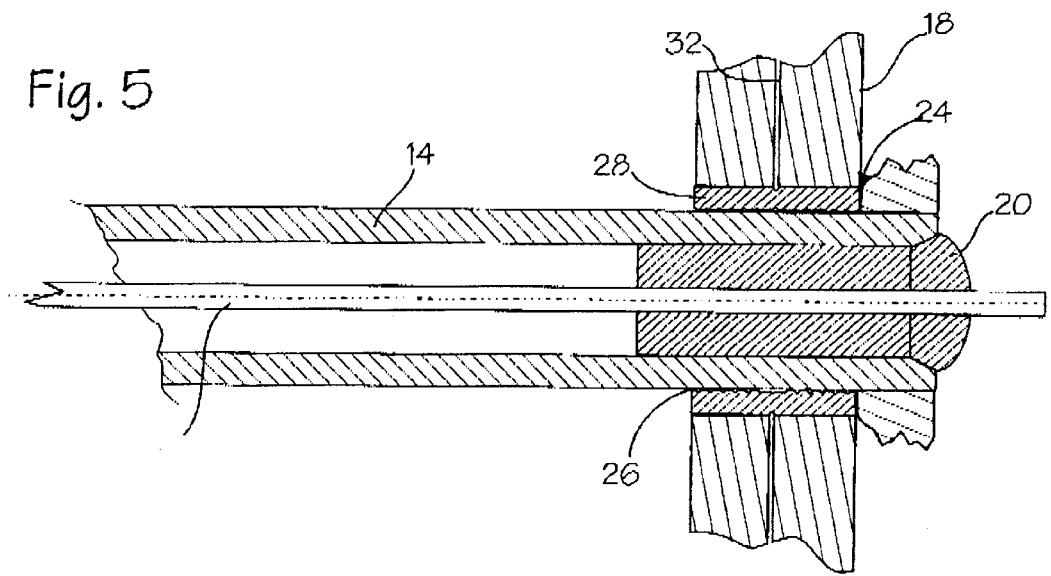
FIG. 5 is a sectional cutaway side view of the machine bearing formed by the spindle bearing surface engaged in the machine bearing.

Turning now to the drawings, FIG. 1 depicts a standard multi-spindle automatic machine 10 as is now used throughout the industry for machining machine parts such as turning shafts, toggle switch handles, various electrical connectors, dental instruments, various fittings, set screws, nuts, hex-head bolts, faucet components, etc. Generally, the forming product comprises a metal rod 11 for each head. The rods are fed from the supply end 12 through a respective spindle 14 to the machining section 16. As is usual, each spindle 14 is carried at its work end by an indexing or rotating head 18, as best seen in FIG. 2. Arranged at the work end of each spindle 14 is the usual collet 20 which acts to grip and hold the associated metal rod 11 during machining. Arranged about indexing or rotating head 18 are a plurality of work stations which comprise cutting tools 22, or other appropriate forming instruments.

Arranged about the periphery of indexing or rotating head 18 are a plurality of machine bearings 24. Each machine bearing 24 comprises a cylinder 28, the inner surface of which forms a cylinder bearing surface 30. Each spindle 14 has a bearing surface 26 formed about its periphery and positioned within cylinder 28 forming the machine bearings 24.

Rotating head 18 is formed with a plurality lubricant or oil supply lines 32 which communicate with an oil supply stored within head 16. Oil is supplied through supply lines 32 to each of the machine bearings 24 in the usual manner. It should be noted that the oil delivered to the machine bearings 24 and the cutting tools 22 may be from the same supply pool or is at least returned to a common supply pool which is at the lower area of machine head 16 and which is also used to lubricate the cutting heads. Because of this, relatively dense oils are required.

Normally, spindles 14 are made of medium to high carbon steel as is also the spindle bearing surface 26. Also, normally cylinder 28 is formed of bronze or iron.

Thus far the structure described is old and is normally present in the multi-spindle bar machines on the market today, such as the Davenport machine manufactured by Davenport Industries of Rochester, N.Y.

As earlier stated, the primary drawback with these machines is that the machine bearings are metal on metal and operate at very fine tolerances in order that the machining may be precise. Yet, these machines must operate at high speed or RPM's, i.e. about 3000 RPM's, in order to be economical. Running at this speed, the bearings described have a run time of between six and ten months, at which time they begin to wear which sets up vibrations and must be replaced.

The replacement down time is compounded by the required break in period required for the new bearings which ranges between 120 hours and 240 hours. During this break in period the machine must be run at lower RPM's, as low as 500 RPM, and constantly monitored until a constant operating temperature of about 120 degrees is achieved.

The instant invention, in all tests conducted to date, eliminates the break in time and more than doubles the run time.

Primarily, the invention consists of two modifications. First, spindle 14 and particularly spindle bearing surface 26 is coated a tungsten carbide/carbon coating. The coating is preferably applied in alternating layers of amorphous carbon and tungsten carbide particles to a surface finish of 4–5 rms. It has been found that in use the coating on spindle 14 will rub or migrate onto the bearing surface 30 of cylinder 28 providing mating surfaces which resist wear, scuffing, galling and seizure.

It is noted that the surface finish may be varied between rms found to be suitable.

The second and possibly the more significant of the modifications concerns cylinder 28.

Cylinder 28 is formed with an outer circular groove 34 which is aligned with oil supply line 32 when the cylinder is positioned within rotating head 18. Formed in circular groove 34 is preferably a pair of supply holes 36. These holes are normally in opposed positions about the periphery of the cylinder. Formed on the inner side of cylinder 28 is a second inner circular groove 38. Inner groove 38 is arranged beneath outer groove 34 and also is penetrated by holes 36. Arranged on one side of and communicating with inner groove 38 is spiral groove 40 which continues in a first direction along the inner surface of cylinder 28 through the end thereof at 40'. A second spiral groove 42 begins communicating with the opposite side of inner groove 38 and spirals in a second direction opposite the direction of spiral of groove 40 through the opposite end of cylinder 28 at 42'. It is noted that grooves 40 and 42 may connect with inner groove 38 adjacent holes 36 or between holes 36. Also, it is possible that only one spiral groove be formed so long as it penetrates through each end of the cylinder and is provided with oil along its entire length.

Holes 36 are formed connecting circular groove 34 with circular groove 38. There are preferably four holes 36 equally spaced about the circumference of cylinder 28 although this number is not fixed. It could be as few as one and as many as eight.

Each hole 36 has a diameter of about 0.1". A recess 50, centered about each hole 34 is formed in the outer surface of cylinder 28. Recess 50 has a diameter of about 0.50" and a depth of about 0.160 inches. Groove 34 penetrates the side wall of recess 50 to a depth of about 0.025".

A compressed felt filter 52 is shaped to be received in recess 50. Filter 52 is formed to be about 0.125" in height and about 0.50" in diameter. A resilient wire housing 54 is formed about filter 2. Housing 54 acts to assist in maintaining the filter in its desired configuration and is designed to achieve a resilient or press fit within recess 50. Housing 54 acts to retain the filter in position during the mounting of cylinder 28 in rotating head 18.

Preferably there is a slight clearance of about 0.035" between the outer surface of cylinder 28 and the outer surface of filter 52.

Preferably all groves are cut to be at least 0.030"R and 0.025" depth. These limits may vary by 0.015". Also, it is preferred that spiral grooves 40 and 42 be cut between three and fourteen threads per inch with seven being preferred.

Between each groove 40 and 42 a flat 44 is formed which extends to the opposite ends of cylinders 28.

Installed with the rotating head, each cylinder 28 has its outer circular cavity aligned with an oil supply line 32. Spindle bearing surface 26 is located within and against cylinder bearing surface 30 and is supported on flats 44. There is a constant clearance between these surfaces of only 0.0013" to 0.0011", preferably closer to the latter. Lubricant, normally oil, is supplied through lines 32 into groove 34 where it moves about cylinder 28. As the oil moves from groove 34 into recesses 50 and into contact with filter 52 all impediments or trash which may have contaminated the oil is removed. Primarily this trash consist of very fine metal shavings which find their way into the oil supply-about the outer side of cylinder 28. Once through holes 36, the filtered oil moves about groove 38 and into spiral grooves 40, 42. As it passes along the spiral of grooves 40, 42, it is exposed at some point to the entire circumference of cylinder 28 along its entire length. The oil continues along each spiral groove until it reaches the opposing ends of the cylinder 28 where it passes out of the bearing and is redeposited with the oil supply.

It is noted that spiral grooves 40, 42 are not necessarily of constant size along their entire length. It may be desirable to alter the size of each spiral groove adjacent its exit point from cylinder 28 in order to adjust the bleed of flow rate.

Spindle bearing surface 26, carried within cylinder 28, is contacted along its entire length at some point by the lubricant in grooves 40, 42. As spindle 14 rotates, its oil exposed bearing surface areas pick up and carry or smear the oil over the supporting surface of the flats. Excess oil is simply redeposited in the groove as the shaft rotates. This prevents the oil coating the spindle bearing surface and the flat surface from overheating. Also, as spindle 14 rotates it acts to push, or urge, or convey the oil through the spiral grooves and out through the openings at 40' and 42' which also prevents overheating and maintains the oil supply within the spiral grooves fresh.

Tests have been conducted on machines within operating facilities. In those tests there was no break in period required. The machines with the just installed bearings of the invention were immediately brought up to speed with no excessive heat build up. They have been run continuously at 3000 RPM for over a month with no significant heat build up and no seizures.

While a preferred embodiment of the invention has been described using specific terms, such description is for illustrative purposes only, and it is to be understood that changes and variations may be made without departing from the spirit or scope of the following claims.

What is claimed is:

1. A high speed bearing comprising:
    a spindle bearing surface formed about a spindle;
    a bearing cylinder having an outer surface and an inner bearing surface adapted to fit over said spindle bearing surface forming a machine bearing;
    a spiral groove arranged about said cylinder bearing surface forming a flat between spirals of said spiral groove, said spiral groove extending the length of said cylinder terminating through opposing end surfaces thereof;
    a first circular groove about said cylinder outer surface and a second circular groove about said inner bearing surface;
    an opening interconnecting said first and second circular grooves;
    a filter located in said opening;
    a lubricant supply arrangement supplying lubricant about said first circular groove for filtered passage to and about said second circular groove; whereby rotation of said spindle causes said spindle bearing surface to rotate against said flat and over said spiral groove causing said filtered lubricant to be moved through said spiral groove, about said spindle bearing surface and over said flat.

2. The bearing of claim 1 wherein said spiral groove comprises a first and a second spiral groove, said first spiral groove spiraling in a first direction and said second spiral groove spiraling in a second direction opposite to said first direction, each of said first and second spiral grooves forming respectively a first and second flat there between.

3. The bearing of claim 2 wherein said first and second spiral grooves begin substantially centrally of said bearing surface.

4. The bearing of claim 2 wherein said second circular groove is located substantially centrally of said cylinder and supplies filtered lubricant to said first and second spiral grooves, and rotation of said spindle bearing surface assist in moving said lubricant in opposite directions through said first and second spiral grooves and out the end surfaces of said cylinder.

5. The bearing of claim 2 wherein said first and second spiral grooves are cut to about seven threads per inch.

6. The bearing of claim 2 wherein said first and second spiral grooves are about 0.030 inch R×0.025 inch depth.

7. The bearing of claim 1 wherein said first circular groove is about 0.030 inch R×0.025 inch depth.

8. The bearing of claim 1 wherein said second circular groove is about 0.030" inch R×0.025 inch depth.

9. The bearing of claim 1 wherein said opening has a diameter of about 0.50 inch.

10. The bearing of claim 1 including a recess formed in the outer surface of said cylinder about said hole, said recess receiving said filter below said outer surface.

11. The bearing of claim 1 wherein said filter comprises a felt disc encased in resilient mesh.

12. The bearing of claim 11 including a recess formed about said hole, said filter resilient engaging with said recess.

\* \* \* \* \*